(12) United States Patent
Eckstein et al.

(10) Patent No.: US 11,458,985 B2
(45) Date of Patent: Oct. 4, 2022

(54) METHOD, DEVICE, AND COMPUTER PROGRAM FOR THE OPERATION OF A VEHICLE OPERATION SYSTEM

(71) Applicant: ZF Friedrichshafen AG, Friedrichshafen (DE)

(72) Inventors: Lutz Eckstein, Aachen (DE); Jan Bavendiek, Roetgen (DE); Jaqueline Weber, Aachen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 103 days.

(21) Appl. No.: 16/622,836

(22) PCT Filed: May 18, 2018

(86) PCT No.: PCT/EP2018/063119
§ 371 (c)(1),
(2) Date: Dec. 13, 2019

(87) PCT Pub. No.: WO2018/233960
PCT Pub. Date: Dec. 27, 2018

(65) Prior Publication Data
US 2020/0198654 A1 Jun. 25, 2020

(30) Foreign Application Priority Data
Jun. 20, 2017 (DE) ............. 10 2017 210 264.0

(51) Int. Cl.
*B60W 50/14* (2020.01)
*G01C 21/36* (2006.01)
*G06V 20/56* (2022.01)

(52) U.S. Cl.
CPC ......... *B60W 50/14* (2013.01); *G01C 21/3667* (2013.01); *G06V 20/56* (2022.01); *B60W 2050/146* (2013.01)

(58) Field of Classification Search
CPC .............. G06K 9/00791; B60W 50/14; B60W 2050/146; B60W 2556/50;
(Continued)

(56) References Cited

U.S. PATENT DOCUMENTS

| 6,067,502 A * | 5/2000 | Hayashida ........... G01C 21/367 701/428 |
| 2011/0175752 A1* | 7/2011 | Augst ..................... B60R 1/00 340/905 |

(Continued)

FOREIGN PATENT DOCUMENTS

| CN | 102216959 A | 10/2011 |
| CN | 103140377 A | 6/2013 |

(Continued)

OTHER PUBLICATIONS https://www.youtube.com/watch?v=E3MFWPUjltl, Published by YouTube user kikiokyo on Sep. 9, 2012, from 0 seconds to 6 seconds (Year: 2012).*

(Continued)

*Primary Examiner* — Yuri Kan
(74) *Attorney, Agent, or Firm* — Crowell & Moring LLP

(57) ABSTRACT

A method for operating a vehicle operating system, wherein a navigation system provides map information, and a monitoring system monitors driver assistance information, which are displayed on a display device, wherein the navigation system, the monitoring system, the display device, and an operating device are coupled to a control device for data transfer, to display the map information and/or driver assistance information on the display, wherein an operating action is carried out by the operating device in order to change a display scale and/or a display angle in relation to a road surface between a first perspective and a second perspective, wherein the display scale and/or angle are adjusted continuously and/or discretely in at least two steps (Continued)

located within the two perspectives on a virtual visualization path, and wherein the first perspective is substantially perpendicular to the road surface and the second perspective is substantially parallel to the road surface.

16 Claims, 1 Drawing Sheet

(58) Field of Classification Search
CPC ........ B60K 2370/165; B60K 2370/166; B60K 2370/171; B60K 2370/176; B60K 35/00; B60K 37/06; G01C 21/3697; G01C 21/3664; G01C 21/367; G01C 21/3647; G01C 21/3667; G01C 21/3676; G01C 21/36; H04N 13/204; G08G 1/166; G08G 1/0969; G01S 13/867; G06T 15/205; B60C 23/0401; G06F 7/00
See application file for complete search history.

(56) References Cited

U.S. PATENT DOCUMENTS

| | | | | |
|---|---|---|---|---|
| 2012/0221215 A1* | 8/2012 | Sugiyama | .......... | G01C 21/3667 701/51 |
| 2013/0346916 A1* | 12/2013 | Williamson | ........ | G06F 3/04847 715/800 |
| 2014/0365935 A1* | 12/2014 | Moha | ................. | G01C 21/3664 715/769 |
| 2016/0171315 A1* | 6/2016 | Yi | ........................ | H04N 13/204 382/154 |
| 2016/0214612 A1* | 7/2016 | Kashiba | .......... | B60W 30/18163 |
| 2016/0247393 A1* | 8/2016 | Okamoto | .............. | B60W 50/14 |
| 2016/0263997 A1* | 9/2016 | Mizutani | ............. | B60W 40/072 |
| 2016/0358470 A1* | 12/2016 | Pirwani | ................ | G08G 1/0125 |
| 2017/0254661 A1* | 9/2017 | Moore | ............... | G01C 21/3664 |
| 2017/0356755 A1* | 12/2017 | Strawn | .................. | G08G 1/0969 |
| 2017/0358113 A1* | 12/2017 | Bray | ................... | G01C 21/3667 |
| 2018/0273050 A1* | 9/2018 | Tertoolen | .......... | G08G 1/096861 |

FOREIGN PATENT DOCUMENTS

| | | | | |
|---|---|---|---|---|
| CN | 105691299 A | 6/2016 | | |
| DE | 10 2008 056 974 A1 | 5/2010 | | |
| DE | 112010005670 T5 | * 7/2013 | ............. | G08G 1/166 |
| DE | 10 2013 016 240 A1 | 6/2014 | | |
| DE | 102013016240 A1 | * 6/2014 | ............. | G01C 21/36 |
| EP | 2 194 508 A1 | 6/2010 | | |
| EP | 2660625 A1 | * 11/2013 | ........... | G01S 13/867 |
| JP | 2002271783 A | * 9/2002 | ........... | G06T 15/205 |
| WO | WO-2005080120 A1 | * 9/2005 | ......... | B60C 23/0401 |
| WO | WO 2014/188254 A1 | 11/2014 | | |

OTHER PUBLICATIONS

International Search Report for PCT/EP2018/063119, dated Sep. 13, 2018, 4 pgs.
Office Action and English Translation in corresponding Chinese Application No. 201880040969.8, dated Jun. 29, 2022 (18 pages).

* cited by examiner

METHOD, DEVICE, AND COMPUTER PROGRAM FOR THE OPERATION OF A VEHICLE OPERATION SYSTEM

RELATED APPLICATIONS

This application is a filing under 35 U.S.C. § 371 of International Patent Application PCT/EP2018/063119, filed May 18, 2018, claiming priority to German Patent Application 10 2017 210 264.0, filed Jun. 20, 2017. All applications listed in this paragraph are hereby incorporated by reference in their entireties.

TECHNICAL FIELD

The invention relates to a method for operating a vehicle operating system for a vehicle. The invention also relates to a vehicle operating system for a vehicle and a computer program product. In particular, the invention relates to a motor vehicle with such a vehicle operating system.

BACKGROUND

By way of example, DE 10 2008 056 974 A1 discloses a motor vehicle operating system that has a navigation system that provides street map information, a vehicle monitoring system that provides vehicle information, and a display device for displaying the street map information and the vehicle information. The motor vehicle operating system also has an operating device for determining an operating action, and a control device. The control device is configured and coupled to the navigation system, the vehicle monitoring system, the display device, and the operating device such that it is switched from a zoom operating state to a monitoring operating state by a further zoom operating action when it is in a zoom operating state in at least one predefined operating situation or zoom situation, in particular when a zoom factor has been set to a limit value.

SUMMARY

The object of the present invention is to further develop a vehicle operating system of the type described above. This object is achieved by the subject matter disclosed herein. Preferred embodiments are also described in the present disclosure.

According to a method according to the invention for operating a vehicle operating system for a vehicle, map information is provided by a navigation system, and driver assistance information is monitored by a monitoring system, wherein the map information and/or driver assistance information are displayed separately or together on a display device, wherein the navigation system, the monitoring system, the display device, and an operating device are coupled to a control device for data transfer in order to display the map information and/or driver assistance information on the display device by means of a control logic, wherein an operating action is carried out by means of the operating device, in order to change the display scale for the map information and/or a display angle relating to a road surface for a perspective display of the map information between a first perspective and a second perspective, wherein the display scale and/or display angle are adjusted on a predefined virtual visualization path, continuously and/or discretely in at least two steps located within the two perspectives, and wherein the first perspective is substantially perpendicular to the road surface, and the second perspective is substantially parallel to the road surface.

The map information provided by the navigation system is understood to be street map information, wherein the map information can be displayed in the form of moving animation on the display device. The display device can be a digital screen or digital display, on which the moving animation is displayed visually. Animation refers to a technology in which a moving image is obtained for the observer from the creation and displaying of numerous individual images. The individual images are preferably created or computed by means of a computer.

The monitoring system can be, e.g., a system for monitoring driver assistance information composed of one or more sensors, which monitors various components, modules, and/or areas of a vehicle. Driver assistance information can be, e.g., the oil level in a vehicle determined with an oil level sensor. The tire pressure in one or more of the tires on a vehicle can also be monitored, for example. It is also conceivable to detect objects or vehicles located in the environment of the vehicle, and monitor the corresponding distance thereto with one or more sensors located on a vehicle body. The driver assistance information obtained in this manner and evaluated by means of a control device can be displayed directly and automatically on the display device. The driver assistance information can be displayed on the display device separately, or together with the map information.

The operating device can comprise, e.g., one or more levers, buttons, and/or knobs, with which the display scale and display angle of the map information can be adjusted on the display device by an operating action. The display scale is understood to be an enlargement factor or zoom factor for the street map depicted on the display device, wherein the depicted map information is reduced in size with a smaller enlargement factor, and enlarged with a larger enlargement factor.

Both the display scale and the display angle can be set separately. According to a preferred exemplary embodiment, the display scale and display angle are set collectively, i.e. such that they are analogous to one another. The display scale and the display angle are located on the virtual visualization path, from which a virtual camera, which is not real, views the animated map information, wherein the virtual camera image generated in this manner is displayed digitally on the display device. The virtual camera thus generates a perspective view of the animated map information in which the point of view and/or perspective can be set. With an analogous change in the display scale and the display angle by means of an operating action applied to the operating device, the virtual camera then travels along the visualization path, and thus modifies the enlargement factor or the perspective on the map information or on the depicted street map.

The visualization path preferably follows the course of an exponential function. The perspective of the virtual camera has a display angle that is between the substantially perpendicular and substantially parallel with respect to the road surface. Substantially perpendicular means that the display angle is at least nearly 90° to the road surface. Substantially parallel means that the display angle is at least nearly 0° to the road surface. The first perspective of the perspective display of the map information preferably has a display angle of 90° to the road surface. The second perspective of the perspective display of the map information preferably has a display angle of 0° to the road surface. This means that the display angle of the perspective lies between 0° and 90° in each of the intermediate positions of the virtual camera in relation to the visualization path.

A vehicle graphic object is preferably depicted on the display device indicating the position of the vehicle in relation to the map information of the navigation system. The vehicle graphic object can be displayed for this as an animated vehicle or as a point on the display device. With an analogous modification of the display scale and the display angle by means of the operating action carried out on the operating device, the size of the vehicle graphic object is adjusted analogously to the perspective on the vehicle graphic object.

A continuous modification of the display scale and/or the display angle is understood to be a uniform modification of the display scale and/or the perspective that subjectively improves or renders the operation of the vehicle operating system for the driver more pleasant and intuitive. The display scale and/or display angle can be guided to an arbitrary observation position or to an arbitrary observation angle. The virtual camera is thus guided from a first virtual camera position to a second virtual camera position, from where the map information and the vehicle graphic object can be observed on the display device. The modification of the display scale and/or the display angle on the visualization path can also take place discretely in at least two steps in which specific and predefined virtual camera positions can be set in a targeted manner at a predefined display angle and display scale. Moreover, the discrete modification of the display scale and/or display angle can comprise three or more steps. It is also conceivable to combine a continuous modification and a discrete modification of the display scale and/or display angle in order to simplify the adjustment and modification of the display scale and/or display angle for the user, or to make it more pleasant.

The control device is also preferably coupled to a camera system that has at least one camera for providing real image recordings of an environment lying in the driving direction of the vehicle, in order to display the real image recordings on the display device by means of a control logic. A real image recording can be, e.g., a real time recording or a temporally offset recording of the environment lying in the driving direction of the vehicle. The depiction of the real image recording on the display device represents the second perspective in this case. After the display of the map information has reached an angle of 0° in relation to the road surface from an arbitrary display angle and/or display scale, i.e. a depiction of the map information and the vehicle graphic object parallel to the road surface, it is possible to switch from this depiction to a real image recording in a preferred embodiment, in which the environment lying in the driving direction of the vehicle is displayed realistically. The real image is recorded by the camera, and evaluated by the camera system, and depicted on the display device. Alternatively, the real image recordings can be abstracted by means of the control logic, wherein the abstraction of the real image recordings represents a conversion of the real images, e.g. a virtual, animated image of the traffic situation is created from the real images by means of the control logic. By way of example, symbols for vehicles or obstructions can be used, and information of no interest to the driver, e.g. advertising billboards, landscaping, etc., is masked.

In an advantageous embodiment of the invention, the first perspective is displayed on the display device as a global perspective, and the second perspective is displayed on the display device as a real image recording of the environment lying in the driving direction of the vehicle. The global perspective is an animated depiction. Preferably, upon approaching the first perspective through the modification of the display scale and/or display angle, a change in the depiction of the vehicle graphic object can take place, wherein, with a reduced display scale, it is reasonably possible to change from an animated vehicle to a simplified depiction of a point. According to a preferred embodiment, the virtual global perspective is oriented to the north. Alternatively, the perspective can be oriented in another direction, or the orientation can change. The actual position is depicted on the display device by the vehicle graphic object in this case.

Preferably, the operating action results in a continuously smooth or universal switching from the perspective display of the map information to a vehicle interior view, subsequently to the depiction of the digital instrument cluster, and then to the real image recordings of the environment lying in the driving direction of the vehicle, wherein the vehicle interior view and the map information are moving animations. The change from the moving animation to the real image recording preferably takes place in a continuously smooth manner, resulting in a more pleasant transition from the view of the map information to the depiction of the vehicle environment. The reduction, preferably a complete elimination, of undesired, hard, in particular not continuously smooth image changes between the different display scales and/or display angles is particularly advantageous in the continuously smooth changes in the display scale and/or display angle and the corresponding change to the real image recording. In other words, the change from the virtual depiction to the real image and back is soft and intuitive.

The invention includes the technical teaching that the at least one camera in the camera system is located at the front of the vehicle for displaying real image recordings on the display device. This at least one camera can be a fisheye camera, with an aperture of up to 180°, for example. The camera can be located on the front of the vehicle, i.e. the hood, front bumper, and/or grill. For a preferably continuously smooth change in the depiction on the display device, the aperture can enlarge continuously form 0° to 180° when changing from the animated display of the map information to a display of the real image recording. In a reversal from the display of the real image recording to an animated display of the map information, the aperture of the fisheye camera can decrease continuously from 180° to 0° accordingly.

The camera system preferably comprises numerous cameras for generating real image recordings of an environment of the vehicle, which are located on the sides and/or the front of the vehicle. In addition to a fisheye camera in the front of the vehicle, one or more cameras can be placed on both sides of the vehicle. This has the advantage that when the vehicle is exiting a narrow street, the cross-traffic can be located, in order to be able to react to a critical driving situation.

The display device is preferably an instrument cluster for displaying at least the speed of the vehicle and other vehicle-relevant information, e.g. engine speed, or driving range. The display device thus replaces a conventional instrument cluster. Moreover, the display device depicts the instrument cluster digitally, and indicates at least the speed and, e.g., the engine speed of the vehicle, preferably by means of moving animation. Furthermore, the digital instrument cluster can also contain other information, e.g. motor oil temperature and/or fuel level, and/or the charging state of the battery. For this reason, it makes sense to place the display device in front of the driver, within the driver's immediate field of vision. Alternatively or additionally, the display device can be placed in the middle of the vehicle, such that both the driver and a potential passenger can see the display from their respective expanded fields of vision. It is also conceivable to design the digital instrument cluster as a head-up display. Furthermore, the map information and/or driver assistance information can be collectively or separately transmitted to a mobile end device, in particular a smartphone, and integrated therein, such that passengers or people outside the vehicle can access the map information and/or driver assistance information.

According to one exemplary embodiment, the setting of the display scale and the setting of the size of the vehicle graphic object on the display device are dependent on the speed. The speed dependence relates to the driving speed of the vehicle. As a result, the driver of the vehicle is able to obtain and process relevant environment information, i.e. map information, with a constant time frame. In other words, as the driving speed increases, the map information can be set to a smaller display scale, and as the driving speed decreases, the display scale can be enlarged.

The setting of the display scale preferably takes place depending on the driving situation and automatically. The term, "driving situation dependent" means that driver assistance information is generated by means of the monitoring system while operating the vehicle, to which the vehicle operating system preferably reacts automatically through the control device. This information can be detected, e.g. by means of a sensor system within the vehicle or in the environment of the vehicle, and depicted on the display device. By way of example, a turning notification may take place during the navigation of the vehicle, that indicates to the driver that the vehicle is to turn the vehicle in a specific direction at a certain point. In the course of this, the display scale can be adjusted automatically, such that the driver of the vehicle can perceive relevant environment information on the display device regarding the immediate environment of the vehicle. Relevant environment information includes, e.g., street signs, speed limits, and/or traffic information. "Automatic" means that a change in the display on the display device and/or an adjustment of the display scale takes place without any vehicle operating action on the part of the user.

In critical driving situations, a vehicle-side change from the display of the map information to the display of the driver assistance information from the monitoring system takes place. Critical driving situations can be, e.g., pressure loss in one or more tires, or coming too close to a forward vehicle. This information is obtained by means of the monitoring system. An automatic, vehicle-side change from the current depiction to a display of the driver assistance information corresponding to the situation on the display device therefore takes place in critical driving situations. As a result, a virtual vehicle image, for example, can be depicted in the driver assistance information display on the display device, such that the point where pressure loss has occurred in one or more tires, or the point, for example, where the vehicle might collide with a forward vehicle, is made clear to the driver.

The method according to the invention can be executed in particular by a computer or a control and evaluation device. The method can thus be implemented as software. This software is an independent, purchasable product, in particular. The invention thus also relates to a computer program product that has machine-readable instructions that, when they are executed on a computer or control unit, upgrade the computer and/or control unit to an operating logic in the vehicle operating system, or cause it to carry out a method according to the invention.

A vehicle operating system for a vehicle according to the invention comprises a navigation system that provides navigation information, a monitoring system that provides driver assistance information, a display device for displaying the map information and/or driver assistance information separately or together, an operating device for determining an operating action, and a control device that is coupled to the navigation system, the monitoring system, the display device, and the operating device, in order to depict the map information and/or driver assistance information on the display device by means of a control logic, wherein a display scale for the map information on the display device can be adjusted between a first perspective and a second perspective by an operating action, characterized in that a display angle in relation to a road surface can be adjusted between the two perspectives to a perspective display of the map information on the display device through the operating action, wherein the display scale and/or display angle can be continuously adjusted or discretely adjusted in at least two steps within the two perspectives, to a predefined visualization path, and wherein the first perspective is substantially perpendicular to the road surface, and the second perspective is substantially parallel to the road surface.

In particular, the vehicle operating system according to the invention is used in a motor vehicle. A motor vehicle is understood to be a vehicle intended for conveying people or goods, depending on its design and its particular devices permanently connected to the vehicle. By way of example, a motor vehicle can be a passenger car or a truck.

BRIEF DESCRIPTION OF THE DRAWINGS

Exemplary embodiments of the invention shall be explained below in greater detail with reference to the two figures, wherein identical or similar elements are provided with the same reference symbols. Therein.

DETAILED DESCRIPTION

Figure 1:
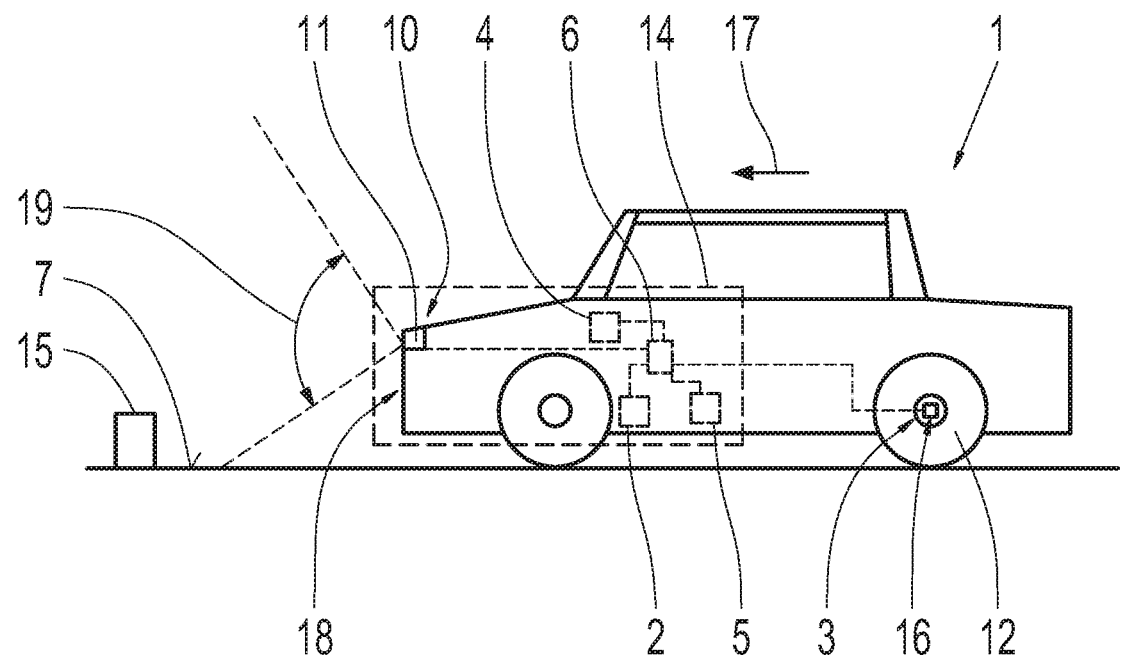
FIG. 1 shows a simplified schematic illustration of a vehicle that has a vehicle operating system according to the invention.

According to FIG. 1, a vehicle 1 in the form of a motor vehicle has a vehicle operating system 14 according to the invention. The vehicle operating system 14 comprises a navigation system 2 that provides map information and a monitoring system 3 that provides driver assistance information. The driver assistance information is obtained by means of a sensor element 16 in the present case, wherein the sensor element 16 is configured to measure tire pressure on a wheel 12 of the vehicle 1. There can also be further sensor elements for detecting, e.g. the environment of the vehicle 1. The vehicle operating system 14 also comprises a display device 4 for displaying the map information and/or driver assistance information separately or together, an operating device 5 for determining an operating action, and a control device 6, which is coupled to the navigation system 2, the monitoring system 3, the display device 4, and the operating device 5, in order to depict the map information and/or driver assistance information on the display device 4 by means of a control logic. The control device 6 is also coupled to a camera 11 in a camera system 10 for providing real image recordings of an environment lying in a driving direction 17 of the vehicle, in order to display the real image recordings on the display device 4 by means of the control logic. The camera 11 in the camera system 10 is located on the front 18 of the vehicle 1, and is designed as a fisheye camera. As a result, it is possible to detect objects 15 in the environment of the vehicle 1 within a recording range 19. The camera system 10 can also comprise more cameras 11, which are placed on the sides and/or front of the vehicle 1 for recording the environment at the side and/or in the driving direction 17 of the vehicle 1.

Figure 2:
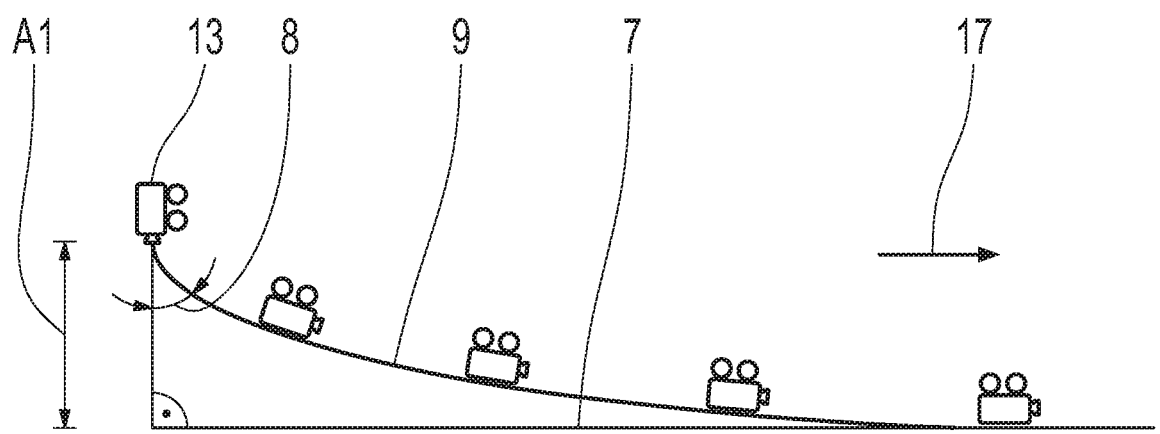
FIG. 2 shows a highly simplified illustration of a preferred embodiment of a method for operating the vehicle operating system according to the invention shown in FIG. 1.

FIG. 2 shows a preferred embodiment of a method for operating the vehicle operating system 14 of the invention according to FIG. 1, in a highly simplified illustration. This is a depiction of the method when executing an operating action in which a virtual camera 13 can be moved on a defined virtual visualization path 9, and describes a change in the display scale dependent on a display angle 8 of the virtual camera 13 in relation to the road surface 7. This change is depicted by a moving animation on the display device 4, and is therefore not realistic.

The virtual visualization path 9 corresponds to an exponential function, the starting and end points of which are limited by the first perspective and second perspective in the map information. The first perspective is defined by a virtual camera 13 substantially oriented perpendicular to the road surface 7. The second perspective is described by a virtual camera 13 substantially oriented parallel to the road surface 7 and in the driving direction 17 of the 1.

The display scale for the map information and/or the display angle 8 to the perspective display of the map information is continuously adjusted smoothly between the two perspectives by means of the operating action on the operating device 5 in the form of a rotating knob, for example. The vehicle operating system 14 is configured in the present case such that the display angle 8 and the display scale for the map information are adjusted analogously to one another. This means that for each desired display scale, a defined display angle 8 of the virtual camera is set. The display scale is described via the distance A1 of the virtual camera 13 to the road surface 7. In the present case, the display scale and the display angle 8 are continuously adjusted. This means that each arbitrary display scale, or each arbitrary display angle 8 of the virtual camera 13 can be adjusted by means of an operating action, wherein the change to the perception perspective or the perception position takes place continuously, in a smooth manner. Alternatively or in combination therewith, the display scale and the display angle 8 can be adjusted discretely in at least two steps within the two perspectives. As a result, the perspective display of the map information on the display device 4 changes continuously in a smooth manner, wherein predefined positions of the virtual camera 13 can be set with a predefined display angle 8 and display scale.

REFERENCE SYMBOLS

1 vehicle
2 navigation system
3 monitoring system
4 display device
5 operating device
6 control device
7 road surface
8 display angle
9 visualization path
10 camera system
11 camera
12 wheel
13 virtual camera
14 vehicle operating system
15 object
16 sensor element
17 driving direction
18 front
19 recording region
A1 distance

The invention claimed is:

1. A method for operating a vehicle operating system for a vehicle, the method comprising:
providing, by a navigation system, map information;
monitoring, by a monitoring system, driver assistance information;
displaying the map information and the driver assistance information on a display device, wherein the navigation system, the monitoring system, the display device, and an operating device configured to be actuated by a driver are coupled to a control device for data transfer in order to display the map information and the driver assistance information on the display device;
receiving, by the operating device, an operating actuation;
changing, by the control device in response to receiving by the operating device the operating actuation, a display of size and angle of a street map view in relation to a road surface between a first perspective and a second perspective; and
adjusting, by the control device, the display of size and angle of the street map view continuously between the first perspective and the second perspective;
wherein the first perspective is substantially perpendicular to the road surface and comprises a virtual animated global perspective, and wherein the second perspective is substantially parallel to the road surface and comprises real image recordings of the environment lying in the driving direction of the vehicle.

2. The method according to claim 1, further comprising:
obtaining, by a camera system that has at least one camera, the camera system coupled to the control device, the real image recordings of the environment lying in the driving direction of the vehicle.

3. The method according to claim 1, further comprising:
abstracting, by the control device, the real image recordings; and
displaying, by the display device, the abstracted real image recordings.

4. The method according to claim 1, further comprising:
depicting a vehicle graphic object on the display device in order to indicate a position of the vehicle in relation to the map information.

5. The method according to claim 4, further comprising:
adjusting, by the operating device, the display of size of the street map view and a size of the vehicle graphic object on the display device depending on the speed of the vehicle.

6. The method according to claim 1, further comprising:
adjusting the display of size of the street map view automatically depending on a driving situation.

7. The method according to claim 1, wherein the display device comprises an instrument cluster with which at least a speed of the vehicle and one further vehicle-relevant information are displayed.

8. The method according to claim 2, further comprising:
switching, by the display device based on the operating action, between at least the perspective display of the map information, a vehicle interior view, an instrument cluster, and the real image recordings, wherein the vehicle interior view and the map information are moving animations.

9. The method according to claim 1, further comprising: changing automatically, in critical situations, from the display of the map information to the display of the driver assistance information.

10. A vehicle operating system for a vehicle, comprising:
a navigation system configured to provide map information;
a monitoring system configured to provide driver assistance information;
a display device configured to display the map information and the driver assistance information at least one of separately or together;
an operating device configured to receive an operating actuation from a user; and
a control device coupled to the navigation system, the monitoring system, the display device, and the operating device, the control device comprising a control logic configured to:
  depict the map information and the driver assistance information on the display device:
  adjust a display of size and angle of a street map view on the display device in relation to a road surface between a first perspective and a second perspective in response to the operating device receiving the operating actuation; and
  adjust the display of size and angle of the street map view continuously on a predefined virtual visualization path between the first perspective and the second perspective,
  wherein the first perspective is substantially perpendicular to the road surface and comprises a virtual animated global perspective, and the second perspective is substantially parallel to the road surface and comprises real image recordings of the environment lying in the driving direction of the vehicle.

11. The vehicle operating system according to claim 10, wherein the control device is also coupled to a camera system comprising at least one camera, the camera system configured to provide the real image recordings of the environment lying in the driving direction of the vehicle.

12. The vehicle operating system according to claim 10, wherein the control logic is configured to abstract the real image recordings, and wherein the display device is configured to display the abstracted real image recordings.

13. The vehicle operating system according to claim 11, wherein the at least one camera is located on the front of the vehicle in order to display the real image recordings on the display device.

14. The vehicle operating system according to claim 11, wherein the camera system comprises a plurality of cameras configured to generate the real image recordings of an environment of the vehicle located at least on the sides of the vehicle and on the front of the vehicle.

15. The vehicle operating system according to claim 10, wherein the display device displays an instrument cluster for displaying at least the speed and further vehicle-relevant information.

16. A non-transitory computer-readable medium containing machine-readable instructions that, when executed by at least one computing device of a vehicle, cause the at least one computing device to perform a method comprising:
providing, by a navigation system, map information;
monitoring, by a monitoring system, driver assistance information;
displaying the map information and the driver assistance information on a display device, wherein the navigation system, the monitoring system, the display device, and an operating device configured to be actuated by a driver are coupled to a control device for data transfer in order to display the map information and the driver assistance information on the display device;
receiving, by the operating device, an operating actuation;
changing, by the control device in response to receiving by the operating device the operating actuation, a display of size and angle of a street map view in relation to a road surface between a first perspective and a second perspective; and
adjusting, by the control device, the display of size and angle of the street map view continuously between the first perspective and the second perspective;
wherein the first perspective is substantially perpendicular to the road surface and comprises a virtual animated global perspective, and wherein the second perspective is substantially parallel to the road surface and comprises real image recordings of the environment lying in the driving direction of the vehicle.

* * * * *